(No Model.)
W. WIESEMANN.
BREAD MIXING STAND.
No. 458,878. Patented Sept. 1, 1891.
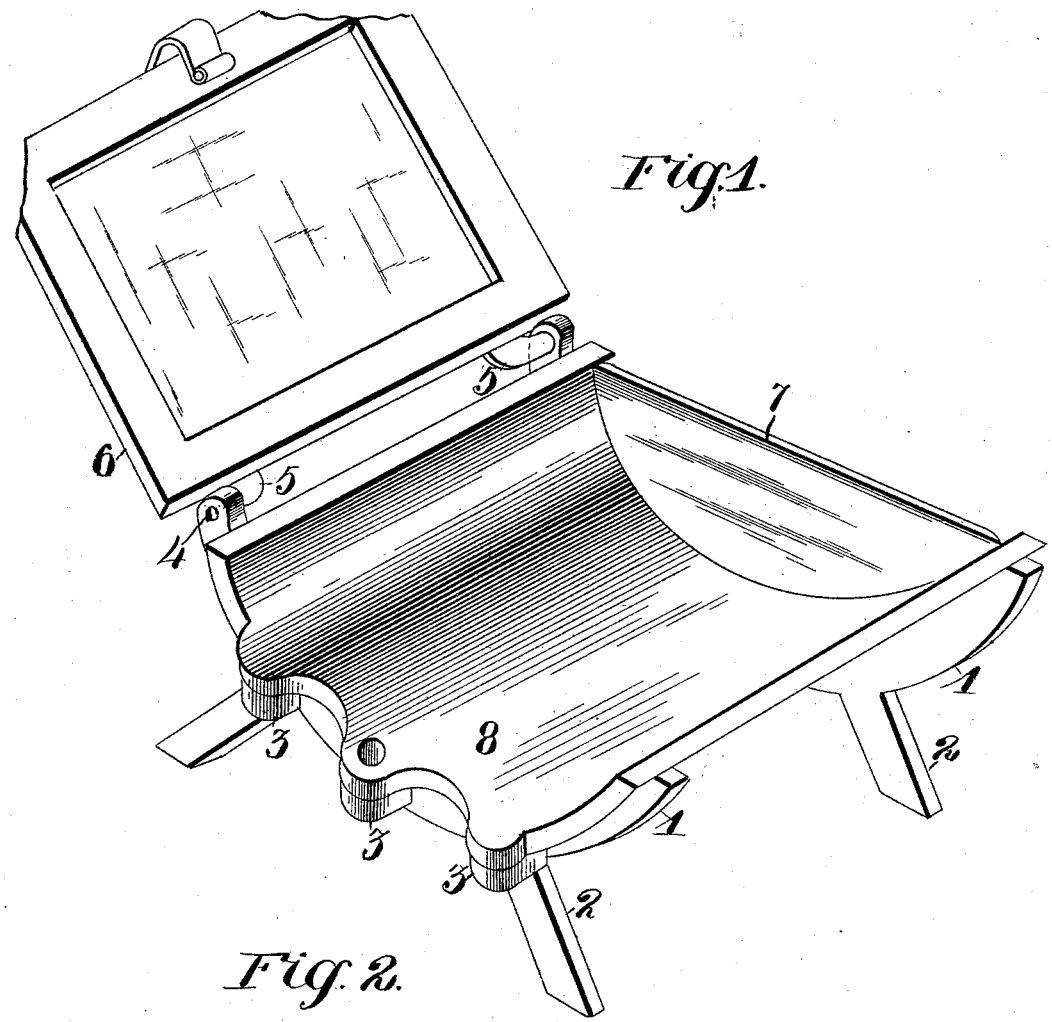
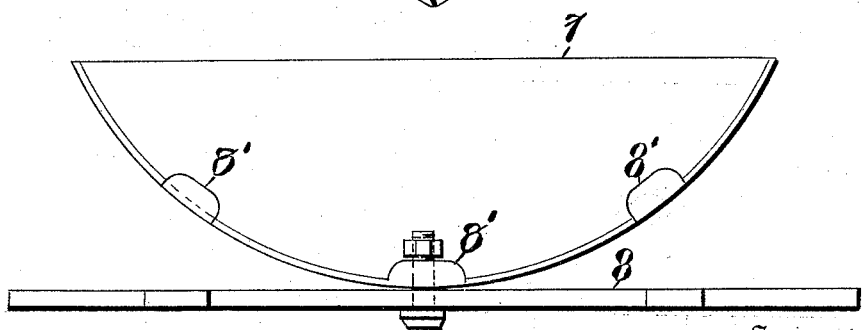
Witnesses
C. F. Keller.
E. E. Longan.
Inventor
Wilhelm Wiesemann
By his Attorneys, Higdon & Higdon

UNITED STATES PATENT OFFICE.

WILHELM WIESEMANN, OF ST. LOUIS, MISSOURI.

BREAD-MIXING STAND.

SPECIFICATION forming part of Letters Patent No. 458,878, dated September 1, 1891.

Application filed April 1, 1891. Serial No. 387,230. (No model.)

*To all whom it may concern:*

Be it known that I, WILHELM WIESEMANN, of the city of St. Louis, State of Missouri, have invented certain new and useful Improvements in Bread-Mixing Stands, of which the following is a full, clear, and exact description, reference being had to the accompanying drawings, forming a part hereof.

My invention relates to improvements in bread-mixing stands; and it consists in the novel arrangement and combination of parts, as will be more fully hereinafter described, and designated in the claims.

In the drawings, Figure 1 is a perspective view of my complete invention, showing the lid open and one end detached; and Fig. 2 is an end view of the bottom before it is bent into proper shape, and also showing an end piece superposed on the same.

Referring to the drawings, 1 indicates the supports for my device, the same being preferably constructed in a semicircular form and provided with legs 2 and external lateral projections 3, one of which, and preferably the center one, being provided with a perforation. Said supports are also provided with perforations 4, in which the hinges 5 of the lid 6 are secured. The supports, projections, legs, and perforations are cast integrally.

7 indicates semicircular end pieces, the same being provided with projections 8', corresponding in number and position to projections 3, formed on supports 1. The rounded edges of said end pieces are sharpened for the purpose hereinafter described.

8 indicates the bottom of my device, which is constructed in a semicircular form, so that no square corners are formed in the same for the accumulation of the substance that may be placed in the same. The bottom 8 is made out of one solid piece of material and bent and secured on the supports 1 by being interposed between said supports and the end pieces, and also by the agency of bolts or screws, which pass through perforations formed in projections 3, and also through perforations formed in projections 8' of the end pieces 7. The sharpened edges of the end pieces 7 will become embedded in the bottom 8 and form a water-tight joint. The lid 6 is made of some transparent material, such as glass, so that the contents may be inspected without opening the lid.

My device, as above described, is designed for use in bread-making and is especially adapted to mix bread in, in lieu of a pan or other receptacle.

Having fully described my invention, what I claim is—

1. A bread-mixing stand consisting of semicircular supports 1, provided with projections 3 and legs 2, semicircular end pieces 7, provided with a corresponding number of projections 8', and a circular bottom 8, the same being secured by being clamped between said supports and end pieces by means of bolts or screws or any suitable fastening device, substantially as set forth.

2. The combination of supports 1, provided with legs 2 and external lateral projections 3 and perforations 4, end pieces 7, having semicircular sharpened edges and provided with lateral projections 8', a semicircular bottom 8, clamped between said supports and end pieces, and a lid 6, hinged to supports 1 by means of hinges 5, substantially as set forth.

In testimony whereof I affix my signature in presence of two witnesses.

WILHELM WIESEMANN.

Witnesses:
EDWARD E. LONGAN,
O. F. KELLER.